United States Patent [19]

Sundet

[11] Patent Number: 4,643,829

[45] Date of Patent: * Feb. 17, 1987

[54] MULTILAYER REVERSE OSMOSIS MEMBRANE IN WHICH ONE LAYER IS POLY-META-PHENYLENE CYCLOHEXANE-1,3,5-TRICARBOXAMIDE

[75] Inventor: Sherman A. Sundet, Wilmington, Del.

[73] Assignee: E. I. Du Pont de Nemours and Company, Wilmington, Del.

[*] Notice: The portion of the term of this patent subsequent to Mar. 31, 1998 has been disclaimed.

[21] Appl. No.: 635,745

[22] Filed: Jul. 30, 1984

[51] Int. Cl.$^4$ ............................................. B01D 13/04
[52] U.S. Cl. ........................ 210/500.33; 210/500.38; 210/500.41
[58] Field of Search .................. 210/490, 500.2, 506, 210/500.33, 500.38, 500.41; 428/315.5

[56] References Cited

U.S. PATENT DOCUMENTS

| | | | |
|---|---|---|---|
| 3,567,632 | 3/1971 | Richter et al. | 210/23 |
| 3,649,687 | 3/1972 | Weyland et al. | 260/544 L |
| 3,744,642 | 7/1973 | Scala et al. | 210/500 |
| 4,277,344 | 7/1981 | Cadotte | 210/654 |
| 4,353,802 | 10/1982 | Hara et al. | 210/654 |
| 4,520,044 | 5/1985 | Sundet | 210/500.2 X |
| 4,529,646 | 7/1985 | Sundet | 210/500.2 X |

*Primary Examiner*—David Sadowski

[57] ABSTRACT

A multilayer membrane for performing reverse osmosis is disclosed. The membrane comprises a porous support and a layer formed of poly meta-phenylene cyclohexane-1,3,5-tricarboxamide. The preferred material for forming the support is a polysulfone.

3 Claims, No Drawings

MULTILAYER REVERSE OSMOSIS MEMBRANE IN WHICH ONE LAYER IS POLY-META-PHENYLENE CYCLOHEXANE-1,3,5-TRICARBOXAMIDE

FIELD OF THE INVENTION

This invention relates to a composite membrane suitable for use in reverse osmosis processes such as for the desalination of aqueous solutions. More particularly this invention relates to a multilayer membrane in which one layer is polymeta-phenylene cyclohexane-1,3,5-tricarboxamide, and one layer is a microporous support layer.

BACKGROUND

Permselective membranes suitable for use in desalination of aqueous solutions are the subject of numerous patents. Richter et al. U.S. Pat. No. 3,567,632 discloses membranes made of organic, nitrogen linked aromatic polymers. Cadotte U.S. Pat. No. 4,277,344 discloses permselective multi-layer membranes in which there is a microporous polysulfone substrate layer and a juxtaposed polyamide layer made from an aromatic triacid halide and an aromatic diamine. Scala et al. U.S. Pat. No. 3,744,642 discloses multilayer membranes in which one layer is porous substrate and the juxtaposed layer is a polyamide, a polyphenylester, or a polysulfonamide. Weyland et al. U.S. Pat. No. 3,649,687 discloses the use of 1,3,5-cyclohexane tricarbonyl chloride in the production of cross linking agent: 1,3,5-cyclohexane triisocyanate. Hara et al. U.S. Pat. No. 4,353,802 discloses semipermeable composite membranes in which the membrane material is cross-linked using polyfunctional aromatic acid halides.

It has now been found that excellent permselective desalination membranes also can be obtained by the use of a porous substrate, and a layer of poly-metaphenylene-cyclohexane-1,3,5-tricarboxamide.

BRIEF DESCRIPTION OF THE INVENTION

The present invention is a multilayer membrane comprising a microporous support layer and a superposed layer of poly-metaphenylene-cyclohexane-1,3,5-tricarboxamide. In a preferred embodiment the microporous substrate is a polysulfone, and the pore size of polysulfone is less than about 20 nanometers in diameter.

Cyclohexane-1,3,5-tricarboxylic acid exists as two geometric isomers: cis and trans (Ref. Alfred Steitz, Jr., J. Organic Chem. 33, 7, 2978-9 (1968)).

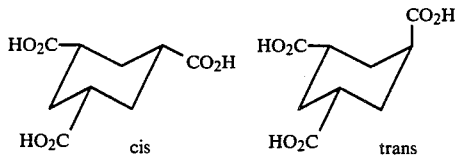

These are two distinct organic compounds, interconvertible only by heating at high temperature (240° C.) for extended periods of time (24 hours), or by appropriate chemical reactions. These two isomeric forms also exist in the corresponding acid chlorides and amides including polyamides.

A convenient method of preparation of the membrane of the invention is by interfacial condensation polymerization, i.e. contacting the polysulfone substrate with a solution of meta-phenylene diamine, and then contacting the polysulfone substrate with the 1,3,5-cyclohexane tricarbonyl chloride solution. The tricarbonyl chloride used can be the cis form, the trans form or mixtures thereof. This method yields very thin films since the reaction is diffusion controlled and self-limiting.

In the membranes of this invention the microporous substrate will normally be about 0.5 to 5 mils thick, and the polyamide layer will normally be about 20 to 200 nanometers thick.

DETAILED DESCRIPTION

The procedures of Cadotte U.S. Pat. No. 4,277,344 are illustrative of the conditions needed for preparing composite membranes of this type. The process consists essentially of several steps:

A microporous substrate with pores less than 20 nm. in diameter is prepared. This may be accomplished with a polysulfone, cast from a 15% solution thereof in dimethylformamide and immediately quenched in water to precipitate the polysulfone and extract the solvent.

This substrate (dried and stored, or fresh and wet) is then loaded with an aqueous solution of the aromatic diamine at a concentration of 1-10%, preferably 2-4% in the water, and the excess solution removed from the surface by some draining, rolling or sponging procedure. The concentration of the diamine is an important factor in the performance of the resulting composite.

If desired the cast polysulfone can be quenched in an aqueous solution containing 0.1-10% by weight, preferably 0.5-5% by weight and most preferably 1-3% by weight aromatic diamine. This technique produces a composite membrane superior to that obtained using the two step aqueous quench followed by loading with diamine process described above.

The loaded substrate is then immersed in a solution of cyclohexane-1,3,5-tricarbonyl chloride (cis, trans, or mixed) in Freon ®TF chlorofluorocarbon liquid or hexane or mixtures thereof (solvents which do not adversely affect the porous structure of the polysulfone substrate) for 5-90, preferably 15-35 secs. at room temperature. Formation of the polyamide causes the originally shiny substrate to have a dull finish. The original cis/trans geometric ratio of the starting cyclohexane tricarbonyl chloride monomer is believed to be retained in the final polyamide.

The resulting composite is then dried at temperatures of 20°-100° C., preferably 50°-70° C., for periods of 5-180 secs., preferably 15-60 secs., to establish adhesion of the surface polyamide to the polysulfone substrate.

The residual diamine and reaction byproducts are extracted by soaking in water.

EXAMPLES

Membrane Testing

The test results shown in the examples were all obtained after seventeen hours of operation at 800 psi feed pressure. Unless otherwise indicated, all permeability properties were determined with 32-33 g/l of NaCl in magnetically stirred permeation cells at pressures of 1000 psi at ambient temperatures. The results are expressed as fraction of NaCl rejected (R), and Kw in units of meters per second per TeraPascal.

$$R = 1 - (C_p/C_f)$$

where $C_p$ is the concentration of NaCl in the permeate and $C_f$ is the concentration of NaCl in the feed.

$$Kw = \frac{\text{Flux}}{\text{Effective Pressure}} \text{ (in m.s.}^{-1} \cdot \text{TPa}^{-1})$$

where flux is the flow rate through the membrane, and effective pressure = feed pressure − opposing osmotic pressure.

EXAMPLES 1-8

A microporous polysulfone substrate was prepared from a 15% solution of a polysulfone derived from bisphenol A and p,p'-dichlorodiphenyl sulfone (Udel ®P3500) having a molecular weight of about 35,000 in dimethylformamide. The solution also contained 0.2% of a surfactant which is the free acid form of a complex organic phosphate ester (Gafac ®RE610), and 0.3% water. With the casting knife set at 6 mils, the casting produced on a glass plate was quenched within 3 secs. in an aqueous solution of 2% dimethylformamide, m-phenylenediamine as indicated, at 8° C. for two minutes, then extracted in aqueous m-phenylenediamine as indicated for three minutes.

The water-swollen substrate, after this extraction, was rolled free of surface solution with a soft rubber roller, then immersed as indicated below in solutions of cyclohexane-1,3,5-tricarbonyl chloride in Freon ®TF (1,2,2-trichloro-1,1,2-trifluoroethane) for the times indicated. After drying for one hour at room temperature, the membranes were extracted in distilled water overnight before testing.

TABLE

| Example | Concentration of m-Phenylenediamine Quench % | Concentration of m-Phenylenediamine Ext. % | Concentration of Cyclohexane-1,3,5-tricarbonyl chloride % w/v | Reaction Time secs | Rejection | Kw m.s.$^{-1}$ · TPa$^{-1}$ |
|---|---|---|---|---|---|---|
| 1 | 1.3 | 1.3 | 0.07 | 15 | 0.987 | 2.68 |
| 2 | 1.3 | 1.3 | 0.07 | 25 | 0.987 | 2.97 |
| 3 | 1.3 | 1.3 | 0.09 | 15 | 0.989 | 3.50 |
| 4 | 1.3 | 1.3 | 0.09 | 25 | 0.985 | 3.16 |
| 5 | 1.0 | 1.0 | 0.08 | 9 | 0.984 | 3.15 |
| 6 | 1.0 | 1.0 | 0.08 | 12 | 0.969 | 3.07 |
| 7 | 1.0 | 1.0 | 0.10 | 9 | 0.984 | 3.48 |
| 8 | 1.0 | 1.0 | 0.10 | 12 | 0.985 | 3.67 |

EXAMPLES 9-12

A microporous polysulfone substrate was prepared as in Examples 1-8 with the exception that the castings were quenched within 3 seconds in water at 8° C. After extraction in distilled water overnight, the membranes were soaked in 1.3% aqueous m-phenylenediamine for the times indicated, before reaction with cyclohexane-1,3,5-tricarbonyl chloride (0.09% w/v) in Freon ®TF for the times indicated. After drying for one hour at room temperature the membranes were extracted in water overnight before testing as in Examples 1-8 after 24 hours of operation.

TABLE II

| Example | Soak in 1.3% MPD | Reaction Time | R % | Kw |
|---|---|---|---|---|
| 9 | 6 | 15 | 95.1 | 4.02 |
| 10 | 6 | 25 | 93.0 | 3.98 |
| 11 | 30 | 15 | 94.3 | 4.00 |
| 12 | 30 | 25 | 95.4 | 4.39 |

What is claimed is:

1. A multilayer reverse osmosis membrane comprising a microporous support layer and superposed thereon a layer of poly-meta-phenylene cyclohexane-1,3,5-tricarboxamide.

2. The membrane of claim 1 in which the microporous layer is a polysulfone.

3. The membrane of claim 2 in which the polyamide layer is formed in situ on the microporous polysulfone layer by interfacial condensation.

* * * * *

UNITED STATES PATENT AND TRADEMARK OFFICE
CERTIFICATE OF CORRECTION

PATENT NO. : 4,643,829

DATED : February 17, 1987

INVENTOR(S) : Sherman A. Sundet

It is certified that error appears in the above-identified patent and that said Letters Patent is hereby corrected as shown below:

The term of this patent subsequent to July 16, 2002 has been disclaimed.

Signed and Sealed this

Twentieth Day of October, 1987

Attest:

DONALD J. QUIGG

*Attesting Officer*  *Commissioner of Patents and Trademarks*